United States Patent
Nishijima et al.

[11] Patent Number: 6,164,852
[45] Date of Patent: Dec. 26, 2000

[54] KEYBOARD DEVICE HAVING A RESIN-COATED CONNECTOR HELD IN IMPROVED FIXED STATE

[75] Inventors: Akio Nishijima; Hideki Ito, both of Fukushima-ken, Japan

[73] Assignee: Alps Electric Co., Ltd., Japan

[21] Appl. No.: 09/407,794

[22] Filed: Sep. 29, 1999

[30] Foreign Application Priority Data

Sep. 30, 1998 [JP] Japan .................................. 10-294558

[51] Int. Cl.[7] .......................................................... B41J 5/08
[52] U.S. Cl. ........................ 400/472; 400/691; 345/168; 361/680
[58] Field of Search ................................. 400/472, 479, 400/691, 692, 693, 719; 341/22, 23; 345/168; 235/145 R; 361/680

[56] References Cited

U.S. PATENT DOCUMENTS

| | | | |
|---|---|---|---|
| 4,976,559 | 12/1990 | Inagaki | 400/691 |
| 5,500,643 | 3/1996 | Grant | 400/489 |
| 5,576,706 | 11/1996 | Daigie et al. | 341/22 |
| 5,654,701 | 8/1997 | Liao et al. | 341/22 |
| 5,717,430 | 2/1998 | Copland et al. | 345/168 |
| 5,828,323 | 10/1998 | Bartet | 341/22 |

FOREIGN PATENT DOCUMENTS 09034614  2/1997  Japan .

*Primary Examiner*—Ren Yan
*Attorney, Agent, or Firm*—Brinks Hofer Gilson & Lione

[57] ABSTRACT

A keyboard device is disclosed which can improve a fixed state of a connector coated with a soft resin and can reduce the number of components without deteriorating the structural strength of the keyboard device. The keyboard device comprises a keyboard body having a plurality of key switches, a connector coated with a soft resin and capable of being connected with an external device, and upper and lower cases which cover the keyboard body and the connector. The thicknesses of connecting portions provided for connecting the connector and the keyboard body to the same positions of the upper and lower cases, and the length from the tip of a fitting portion provided in the upper case and fitted through through-holes up to a clamp width setting portion provided on a base end side of the fitting portion, are set equal to each other.

2 Claims, 4 Drawing Sheets

KEYBOARD DEVICE HAVING A RESIN-COATED CONNECTOR HELD IN IMPROVED FIXED STATE

BACKGROUND OF THE INVENTION

1. Field of the Invention

The present invention relates to a keyboard device and particularly to a technique which permits connection not only to a keyboard body but also to external devices and which is suitable for use in a keyboard device.

2. Description of the Prior Art

As to personal computers and peripheral devices thereof, developments have heretofore been made for the reduction of manufacturing cost and simplification of the structure.

Particularly, a keyboard device connected as an input means to a computer has a keyboard body provided with a large number of key switches, a case which covers the keyboard body while allowing key tops of the key switches to be exposed, and a control unit which is disposed within the case and which controls electric signals transmitted to and received from the keyboard body and a main computer. Since there are a large number of components and the manufacture and assembly of components are expensive, there has been a demand for the reduction of cost.

As such a keyboard device there is one capable of being connected to an external device such as a mouse separately from a main computer. To effect this connection, a connector is connected to a substrate of the control unit in an exposed state from the case so that a plug for connection to an external device can be connected to the connector.

As such a connector there has been proposed a connector whose contact portion for connection with the plug is coated with a soft PVC (polyvinyl chloride).

In the above keyboard device, a strong force is exerted on the connector at the time of inserting or extracting the plug, so it has been necessary that the connector be fixed firmly to the case for example. However, in the case of mounting a soft PVC resin-coated connector to the case, if an attempt is made to clamp and fix the connector with a screw, the resulting pressure may cause deformation of the soft PVC resin.

SUMMARY OF THE INVENTION

The present invention has been accomplished in view of the above-mentioned circumstances and intends to achieve the following objects:

(1) Fixed state of the soft resin connector to the keyboard device is to be improved.

(2) The number of components is to be reduced without deteriorating the structural strength.

According to the present invention, for achieving the above-mentioned objects, there is provided a keyboard device having a keyboard body provided with a plurality of key switches, a resin-coated connector which permits connection with not only the keyboard body but also an external device, and an upper and a lower cases which cover both the connector and the keyboard body in an operable manner, the connector and the keyboard body being respectively provided with connecting portions having through holes for fixing the connector and the keyboard body to the same positions of the upper and lower cases, at least one of the upper and lower cases, preferably the upper case, having a fitting portion to be fitted through the through hole formed in the connecting portion of the connector and also through the through hole formed in the connecting portion of the keyboard body, with a radially projecting clamp width setting portion being provided on a base end side of the fitting portion, the length from the clamp width setting portion up to the tip of the fitting portion being set at a length corresponding to the sum of the thickness of the connecting portion of the keyboard body and the thickness of the connecting portion of the connector.

According to the present invention, the upper and lower cases are fixed by the fitting portion and a clamp portion. Further, when the connector coated with a soft resin and the keyboard body are fixed, both can be fixed without the need of any greater unnecessary force than the fixing force for the connecting portion of the soft resin-coated connector because the clamp width setting portion is provided.

In the present invention, preferably, at least one of the upper and lower cases, more preferably, the lower case is provided with a stopper at the position of abutment with the connector for bearing an inserting force of a plug when the plug is inserted into the connector.

In this case, since the force developed upon insertion of a plug into the connector can be borne by the stopper, it is possible to diminish the force imposed on the soft resin-coated connector and hence possible to prevent deformation of the connector and movement of the connector into the case.

DETAILED DESCRIPTION OF A PREFERRED EMBODIMENT

A keyboard device according to an embodiment of the present invention will be described in detail hereunder with reference to the accompanying drawings.

Figure 1:
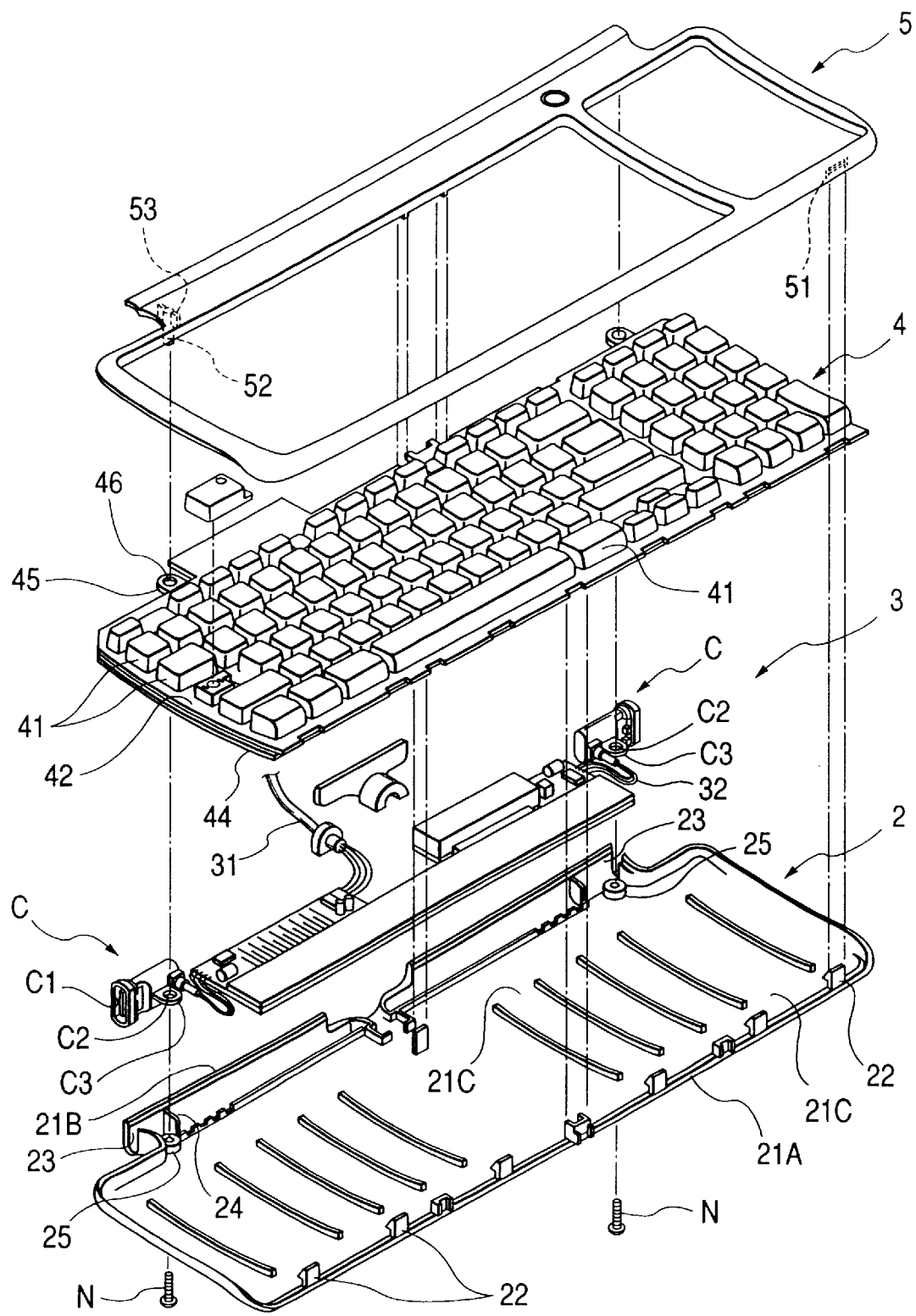
FIG. 1 is an exploded perspective view showing a keyboard device according to an embodiment of the present invention.
Figure 2:
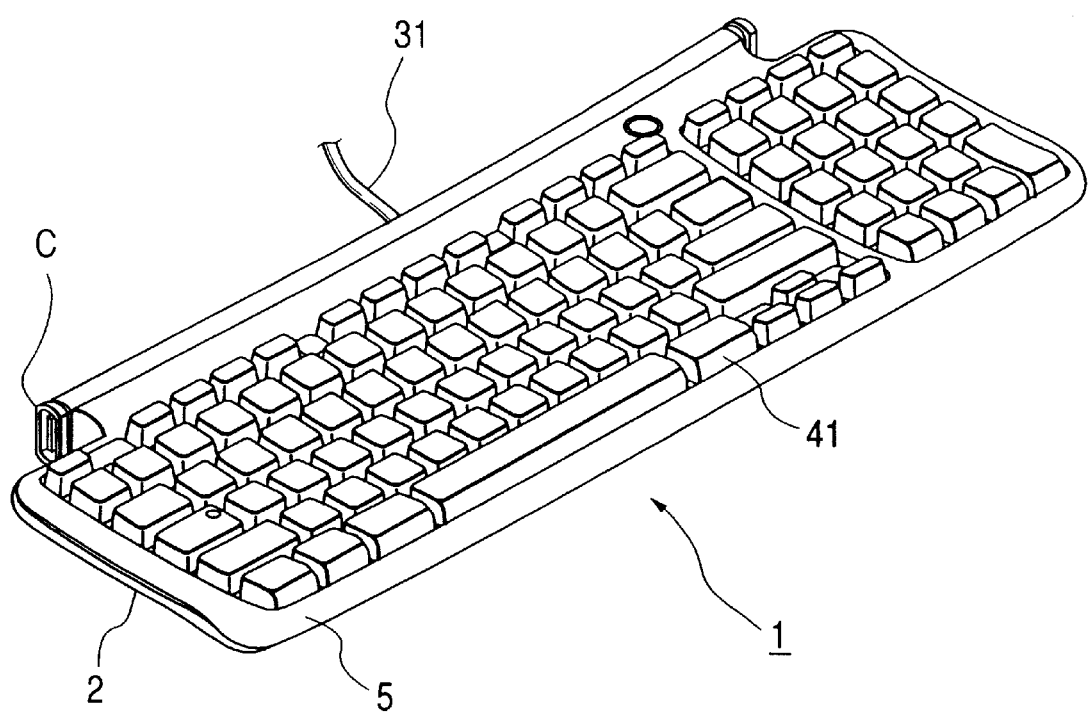
FIG. 2 is a perspective view of the keyboard device.
Figure 3:
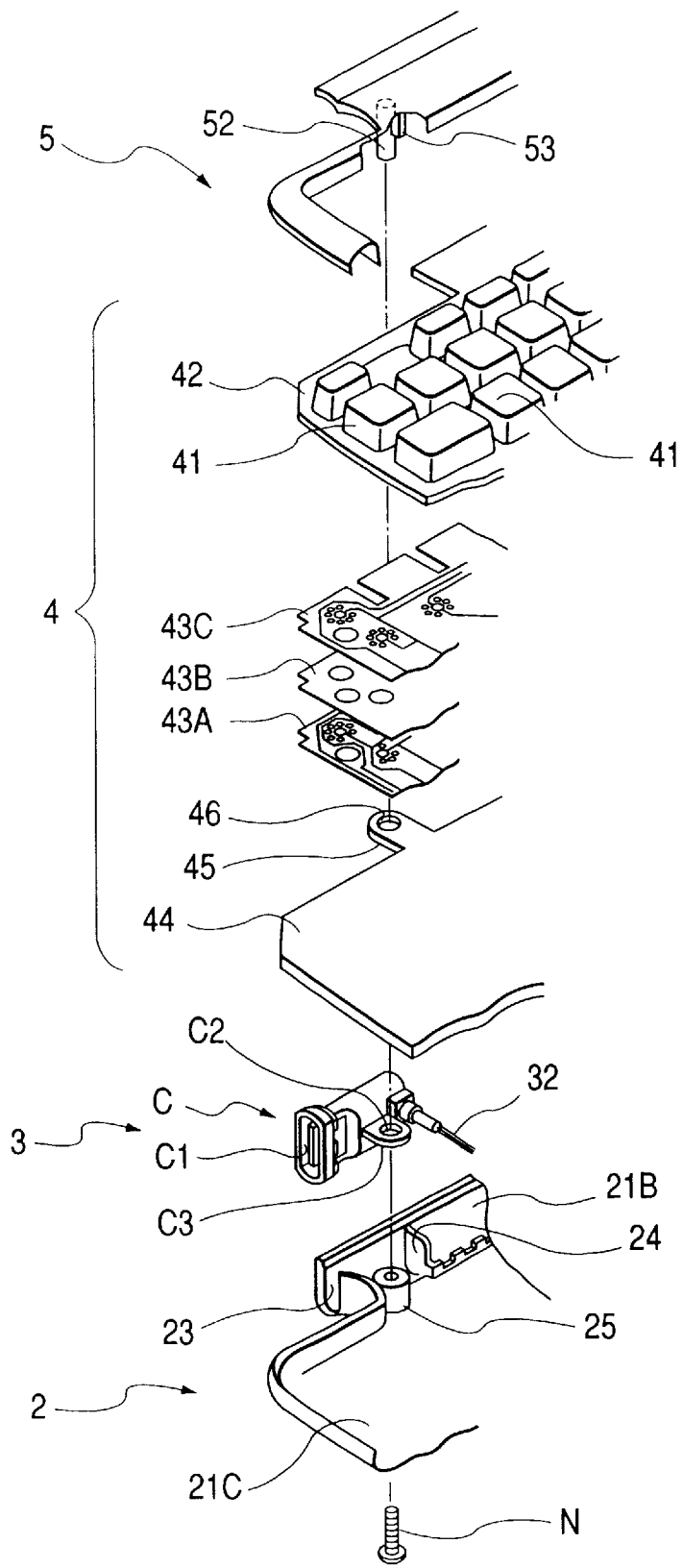
FIG. 3 is an enlarged perspective view showing a state of connection of a connector, a keyboard body, and an upper and a lower cases.
Figure 4:
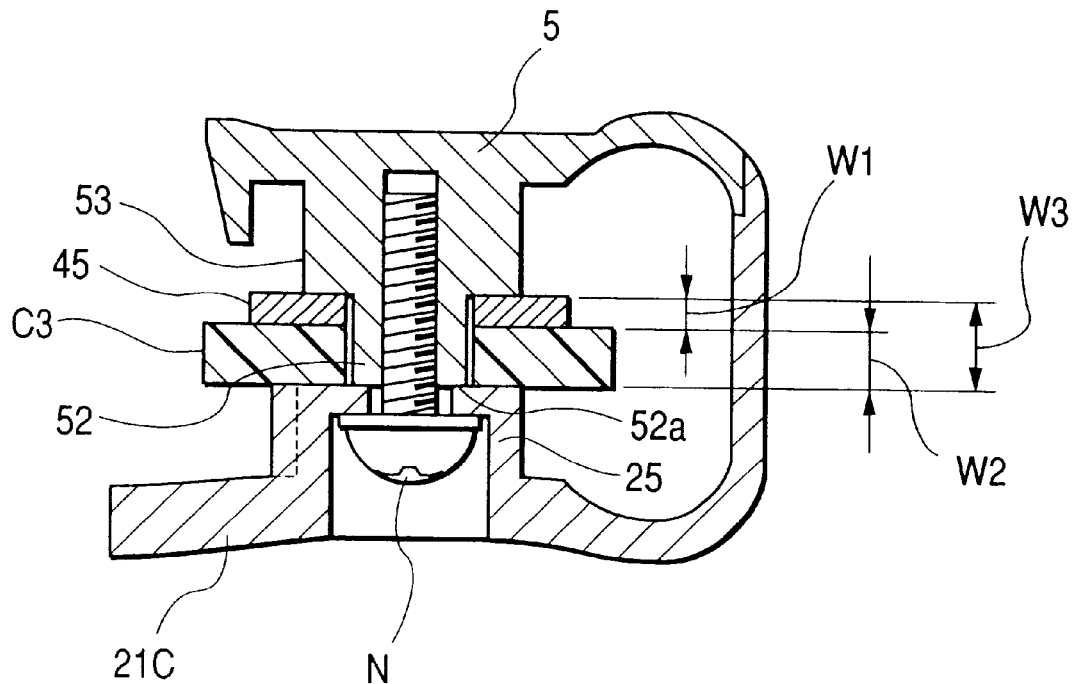
FIG. 4 is a sectional side view thereof.
Figure 5:
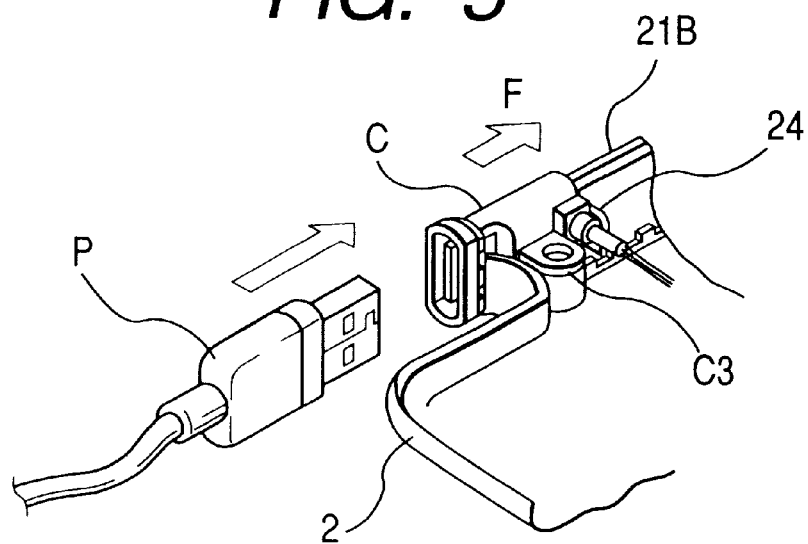
FIG. 5 is a perspective view showing an assembled state of a portion of FIG. 3.

FIG. 1 is an exploded perspective view showing a keyboard device embodying the present invention, FIG. 2 is a perspective view of the keyboard device, FIG. 3 is an enlarged perspective view showing a state of connection of a connector, a keyboard body, and an upper and a lower cases, FIG. 4 is a sectional side view thereof, and FIG. 5 is a perspective view showing an assembled state of a portion of FIG. 3.

In FIGS. 1 to 5, the reference numeral 1 denotes the keyboard device, numeral 2 denotes a lower case, numeral 3 denotes a control unit, numeral 4 denotes a keyboard body, and numeral 5 denotes an upper case.

As shown in FIG. 2, the keyboard device of this embodiment is a transparent keyboard device, which is in a state of skeleton. As shown in FIG. 1, the keyboard device comprises a keyboard body 4 having key tops 41 of plural key switches, a control unit 3 which controls signals to and from the keyboard body 4 and which has a pair of connectors C for connection with the keyboard body 4 and with an external device (not shown), and an upper and a lower cases 2, 5 which cover the control unit 3 and the keyboard body 4 in such a manner that the key tops 41 can be operated. These components are assembled as in FIGS. 1 and 3.

As shown in FIGS. 1 and 3, the lower case 2 is provided with a plurality of fixing portions 22 formed on a front edge portion 21A for fixing the upper case 5, a pair of connector grooves 23 formed in a rear edge portion 21B for setting positions where the connectors C are to be fixed, stoppers 24 formed on the rear edge portion 21B and a bottom portion 21C in the vicinity of the connector grooves 23 to define positions for mounting the connectors C, and clamp portions 25 for abutment with fitting portions 52 of the upper case 5 to be described later and for thereby fixing the upper and lower cases 2, 5, the clamp portions being projected on the bottom portion 21C in the vicinity of the stoppers 24 and the connector grooves 23. As shown in FIG. 4, the diameter of each clamp portion 25 is set larger than the diameter of each fitting portion 52 to be described later.

As shown in FIG. 5 and as will be described later, each stopper 24 not only bears the force induced at the time of inserting a plug P into the associated connector C but also is connected to both the rear edge portion 21B and the bottom portion 21C and acts as a rib for ensuring the structural strength.

As shown in FIGS. 1 and 3, the control unit 3 is positioned on the rear edge portion 21B side of the lower case 2 and it has a cord 31 provided at a central position for connection with a main computer, the connectors C connected to both ends of the control unit through wires 32, and a power switch for the main computer.

Each connector C conforms to the USE standard and its contact for contact with the plug is coated with, say, a white soft PVC (polyvinyl chloride) resin. The connector C is attached to the lower case 2 in such a manner that an opening C1 thereof in which the plug is to be inserted is in a vertically long condition. Further, each connector C has a connecting portion C3 formed of the above soft PVC resin, the connecting portion C3 having a through hole C2 formed in a position which becomes opposed to the associated clamp portion 25 at the time of mounting.

It suffices for each connector C to be coated with a soft resin. The coating material is not limited to the soft PVC resin.

As shown in FIGS. 1 and 3, the keyboard body 4 comprises a housing 42 with a plurality of key switches 41 attached thereto, a metallic plate 44 which, conjointly with the housing 42, sandwiches membrane sheets 43A, 43B and 43C with circuits printed thereon, and two connecting portions 45 for fixing the keyboard body 4 to the upper and lower cases 2, 5. The connecting portions 45 are respectively formed with through holes 46 in positions which become opposed to the clamp portions 25 at the time of mounting, and are connected to the metallic plate 44.

As shown in FIGS. 1 and 3, the upper case 5 has a plurality of hook portions 51 to be fitted with the fixing portions 22 of the lower case 2 and also has fitting portions 52 which pass through the through holes C2 of the connector C and the through holes 46 of the keyboard body 4 into abutment with the clamp portions 25 of the lower case 2 and which are then clamped by clamping means (screws) N.

The fitting portions 52 are each provided on a base end side thereof with a clamp width setting portion 53 projecting radially of the fitting portion. As shown in FIG. 4, the length from the clamp width setting portion 53 up to the tip indicated at 52a of the fitting portion 52 is set at a length $W_3$ which corresponds to the sum of thickness $W_1$ of each connecting portion 45 of the keyboard body 4 and thickness $W_2$ of the connecting portion C3 of each connector C.

In the keyboard device 1, as shown in FIG. 1 and FIGS. 3 to 5, each connector C is fitted in the associated connector groove 23 of the lower case 2 at the position defined by both stopper 24 and clamp portion 25, with its connecting portion C3 abutted against the associated clamp portion 25. Then, with the connecting portions C3 of both connectors C abutted against the connecting portions 45 of the keyboard body 4, the keyboard body is placed above the connectors and the hook portions 51 of the upper case 5 are fitted with the fixing portions 22 from above. At the same time, the fitting portions 52 are fitted through the through holes C2 and 46 into abutment with the clamp portions 25 and are clamped with screws N from below the lower case 2 to secure the upper case 5 to the lower case 2.

As shown in FIG. 4, since the length from each clamp width setting portion 53 up to the tip 52a of the fitting portion 52 is set at the length $W_3$ corresponding to the sum of thickness $W_1$ of each connecting portion 45 of the keyboard body 4 and the thickness $W_2$ of the connecting portion C3 of each connector C, the fitting portion 52 can be fixed to the associated clamp portion 25 without the need of using any unnecessary force greater than the force required for fixing to the connecting portion C3 of the connector C coated with the soft PVC resin. Consequently, the connecting portion C3 can be prevented from deformation.

As noted previously, at the time of inserting the plug P into the connector C in the keyboard device 1 as assembled, the force necessary for the insertion of the plug P is exerted on the connector C, as indicated with arrow F in FIG. 5. But this force F is borne by the stopper 24 which is in abutment with the connector C, whereby the load imposed on the connecting portion C3 of the connector C and also on the portion abutted against the connector groove 23 can be diminished. Consequently, it is possible to prevent deformation of the connecting portion C3 and of the entire connector C.

Thus, since the force imposed on the connector C can be diminished to prevent deformation by the clamp width setting portion 53 and the stopper 24, the structural strength of the keyboard device can be ensured when the upper and lower cases 2, 5 are fixed together by the two fitting portions 52 and the two clamp portions 25; in addition, it is possible to reduce the number of components and attain the reduction of the manufacturing cost.

The fitting portions 52 may be provided on the lower case 2 side, while the clamp portions 25 and stoppers 24 may be provided on the upper case 5 side. Further, the fitting portions 52, clamp portions 25 and stoppers 24 may be provided in each of the upper and lower cases 2, 5.

The following effects are attained by the keyboard device of the present invention.

(1) The keyboard body and the connectors coated with a soft resin are provided with connecting portions having through holes for fixing the keyboard body and the connectors at the same positions of the upper and lower cases, at least one of the upper and lower cases is provided with fitting portions to be fitted through the through holes of the connecting portions of the connectors and further through the through holes of the connecting portions of the keyboard body, a radially projecting clamp width setting portion is provided on the base end side of each of the fitting portions, and the length from the clamp width setting portion up to the tip of the fitting portion is set at a length corresponding to the sum of the thickness of each connecting portion of the keyboard body and the thickness of the connecting portion of each connector. According to this construction, the upper and lower cases can be fixed together by the fitting portions and the clamp portions to fix the connectors and the keyboard body without the need of any unnecessary force greater than the force required for fixing to the connecting portions of the connectors coated with a soft resin, and thus the fixed state can be improved. Consequently, it is possible to prevent deformation of the connecting portions and reduce the number of components required for fixing the connectors and the upper and lower cases, thus permitting reduction of the manufacturing cost.

(2) At least one of the upper and lower cases is provided with stoppers at positions of abutment with the connectors so that the stoppers can bear the force induced upon insertion of plugs into the connectors. Therefore, it is possible to diminish the force exerted on the soft resin-coated connector connecting portions and thereby prevent deformation of the connectors. At the same time, in the case where the stoppers are allowed to serve also as rib members for maintaining the improved strength, it is possible to reduce the number of components and hence possible to attain the reduction of the manufacturing cost.

What is claimed is:

1. A keyboard device having a keyboard body provided with a plurality of key switches, a resin-coated connector which permits connection with not only the keyboard body but also an external device, and an upper and a lower cases which cover both said connector and said keyboard body in an operable manner, wherein said connector and said keyboard body are respectively provided with connecting portions having through holes for fixing said connector and said keyboard body to the same positions of said upper and lower cases;

at least one of said upper and lower cases has a fitting portion to be fitted through the through hole formed in the connecting portion of said connector and also through the through hole formed in the connecting portion of said keyboard body; and a radially projecting clamp width setting portion is provided on a base end side of said fitting portion, the length from said clamp width setting portion up to the tip of said fitting portion is set at a length corresponding to the sum of the thickness of the connecting portion of said keyboard body and the thickness of the connecting portion of said connector.

2. The keyboard device according to claim 1, wherein at least one of said upper and lower cases is provided with a stopper at a position of abutment with said connector, said stopper functioning to bear a force induced upon insertion of a plug into the connector and thereby prevent movement of said connector.

* * * * *